PREPAY PAY STATION ADAPTER

Filed June 8, 1965

INVENTOR:
GLENN F. LONG
BY Kingsland, Rogers, Ezell, Eilers & Robbins
ATTORNEYS

INVENTOR:
GLENN F. LONG,
BY Kingsland, Rogers, Ezell, Eilers & Robbins
ATTORNEYS

PREPAY PAY STATION ADAPTER

INVENTOR:
GLENN F. LONG,
BY Kingsland, Rogers, Ezell, Eilers & Robbins
ATTORNEYS

PREPAY PAY STATION ADAPTER

Filed June 8, 1965

INVENTOR:
GLENN F. LONG,
BY Kingsland, Rogers, Ezell, Eilers & Robbins
ATTORNEYS

PREPAY PAY STATION ADAPTER

Filed June 8, 1965

ELIMINATION OF DISCRIMINATION LEAD

BLOCKING THE PAY PHONE

RE-RING FEATURE

INVENTOR:
GLENN F. LONG,
BY Kingsland, Rogers, Ezell, Eilers & Robbins
ATTORNEYS United States Patent Office 3,448,218

Patented June 3, 1969

3,448,218

PREPAY PAY STATION ADAPTER

Glen F. Long, Dallas, Tex., assignor to Universal Controls Corporation, Dallas, Tex., a corporation of Texas Filed June 8, 1965, Ser. No. 462,271
Int. Cl. H04m *17/02*
U.S. Cl. 179—6.3 18 Claims

ABSTRACT OF THE DISCLOSURE

An adapter for converting existing pay stations and standardizing them to a prepay condition. The adapter is connected between the pay telephone line and the line equipment at the local switchboard to provide all normal prepay features and convert postpay and local prepay to the prepay condition. The adapter comprises means for providing a dial tone when an initial coin is deposited in the pay station, with means to refund the coin on unanswered calls, and circuitry for answer supervision and for collecting or refunding additional coins, including operator controlled separate tone sources communicating with means in the pay station for collecting and refunding additional coins.

The pay telephone has been in use for a great many years and a variety of types have been in use. They are broken down principally into three classifications: postpay, local prepay, and prepay.

The general difference among the three types is the method employed to collect and refund coins. In the postpay type device, once the coin is deposited, it is collected. In the local prepay, the money is deposited and is collected only upon answer by the called party; or in cases where the call is to an operator, the initial coin is returned and the operator has no further control over refunding or collecting of coins which are subsequently deposited. In the prepay telephone, the operator has full control over collecting or refunding of money on toll calls. In addition, the coin is returned anytime the pay station has reached a "no answer."

In examining the operating instructions for two of these three types of pay stations we find the source of the confusion that exists in regard to their use. The failure of the average citizen to read the instructions on postpay and local prepay telephones results in a variety of complaints. These complaints include lost coins, inability to speak to the called party, and complaints from called subscribers. Out of these complaints another problem arises. In many cases the pay station is physically abused because the calling party thinks it is not working. This results in torn receiver cords, broken dials, and jammed coin chutes.

The prepay pay station adapter is designed to standardize the pay telephone in all exchanges, thereby eliminating the problems which exist because three types of pay stations are now available to the public.

The adapter is designed to work with existing switchboards with a minimum modification of facilities. Any line terminal may be assigned to the adapter. Connections to the switchboard are normally made through six leads, namely: tip, ring, sleeve, PS (operator identification lead), dial tone and dial start, battery and ground. The pay station instrument is connected to two leads designated tip and ring. Coin refund voltage is standard-plus and minus 110–130 volts DC.

The adapter incorporates these features:

Dial tone is returned to the calling pay station when coin is deposited.

On calls to the operator, the initial coin is refunded upon answer by the operator.

Subsequent coins deposited are held in the pay phone until the operator determines if she shall collect or refund the coins. If the operator wishes to collect the coin, she depresses a key, sending a signal of 700 cycles to the adapter; to refund a coin she will send a 1100 cycle signal. In the adapter are tone receivers tuned to these two frequencies and output of the receiver signaled determines the coin disposition.

In all cases of "no answer" the coin is refunded.

Employment of tone signaling allows the adapter to operate with either physical or carrier trunks to the toll center.

The adapter provides for two different types of supervision: reverse battery and sleeve lead supervision, normally a high-low resistance condition. In addition, on calls from the pay station to the operator, a dial tone signal is given to the operator indicating it is a pay phone. During this period of approxiamtely one second, the signal is relayed to the pay station to return the coin.

The adapter provides all normal prepay features and is compatible with the usual prepay telephone.

The above features are objects of this invention and further objects will appear in the detailed description which follows and will be otherwise apparent to those skilled in the art.

For the purpose of illustration of this invention, there are shown in the accompanying drawings circuits employed with the prepay adapter of this invention. It is to be understood that these drawings are for the purpose of example only, however, and that the invention is not limited thereto.

The present method of controlling a pay station, to refund or collect money automatically or by the operator, has been in existence for many years. This method consists of special equipment, located in the central office, through which a metallic path is used for passing the coin collect, high voltage, DC current. The equipment is so designed that the metallic path is required when the pay station originates a call or when a call is made to the pay station.

Figure 2:
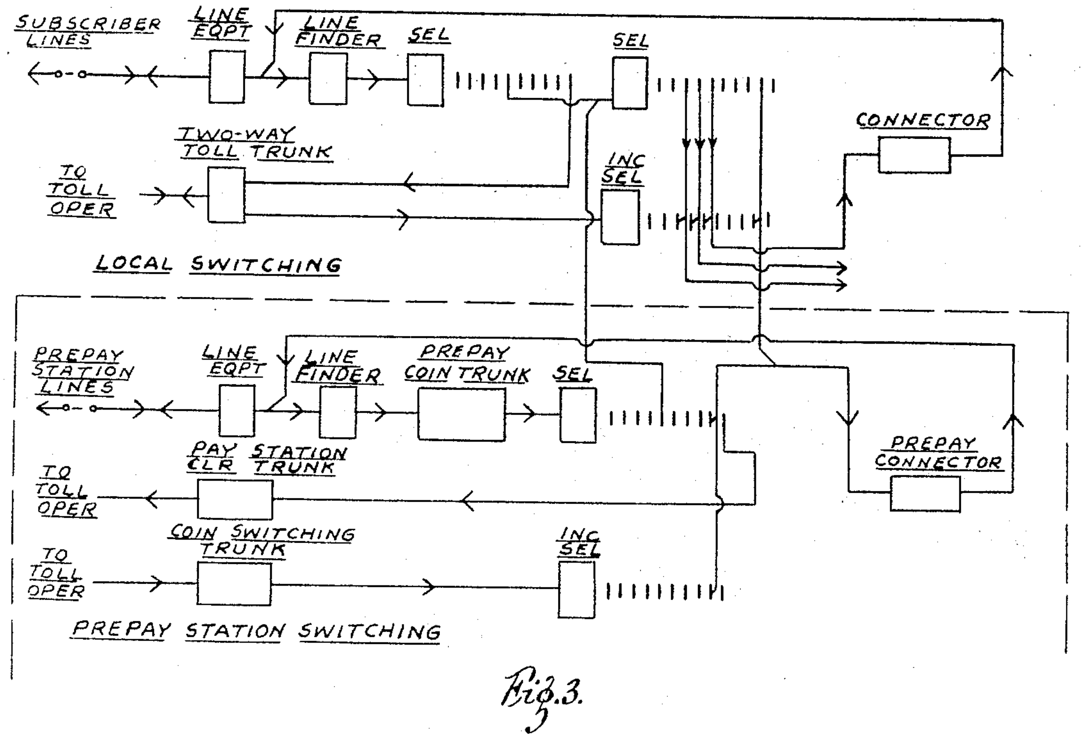
FIGURE 2 is a circuit diagram showing the prepay station switching and the local switching as a typical trunking diagram of a dial office with the trunking arrangement of thet prepay station in the dotted outline.

The equipment presently in use for control of a prepay station, as shown in FIGURE 2, consists of a special group, comprised of; a line finder group, a prepay coin trunk group; a selector group; a prepay connector group; a pay station trunk group to the operator; and a pay station trunk group from the operator. All of these various groups are required to provide a metallic path on local-to-local calls as well as on operator calls.

Figure 3:
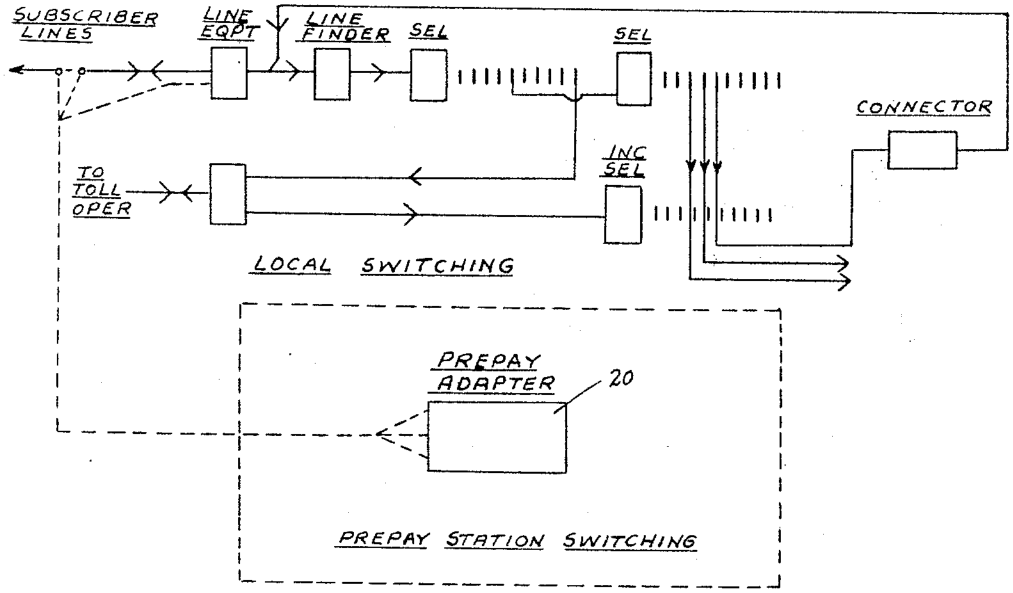
FIGURE 3 is a typical trunking diagram of a dial office with trunking arrangement of the prepay station adapter shown in dotted outline.

When the prepay pay station adapter is used, a metallic circuit is required only between the adapter and the prepay pay station physical line, as shown in FIGURE 3. The operator employs tone signalling to collect or refund coins, as may be required. When tone signalling is used, the existing central office equipment is utilized, thereby eliminating the special groups of equipment usually necessary.

The prepay pay station adapter is inserted between the physical line of the pay station and the line equipment assigned to the pay station, as shown in FIGURE 3. One prepay pay station adapter is required for each pay station. Common equipment consists of standard, high voltage coin supply.

Figure 1:
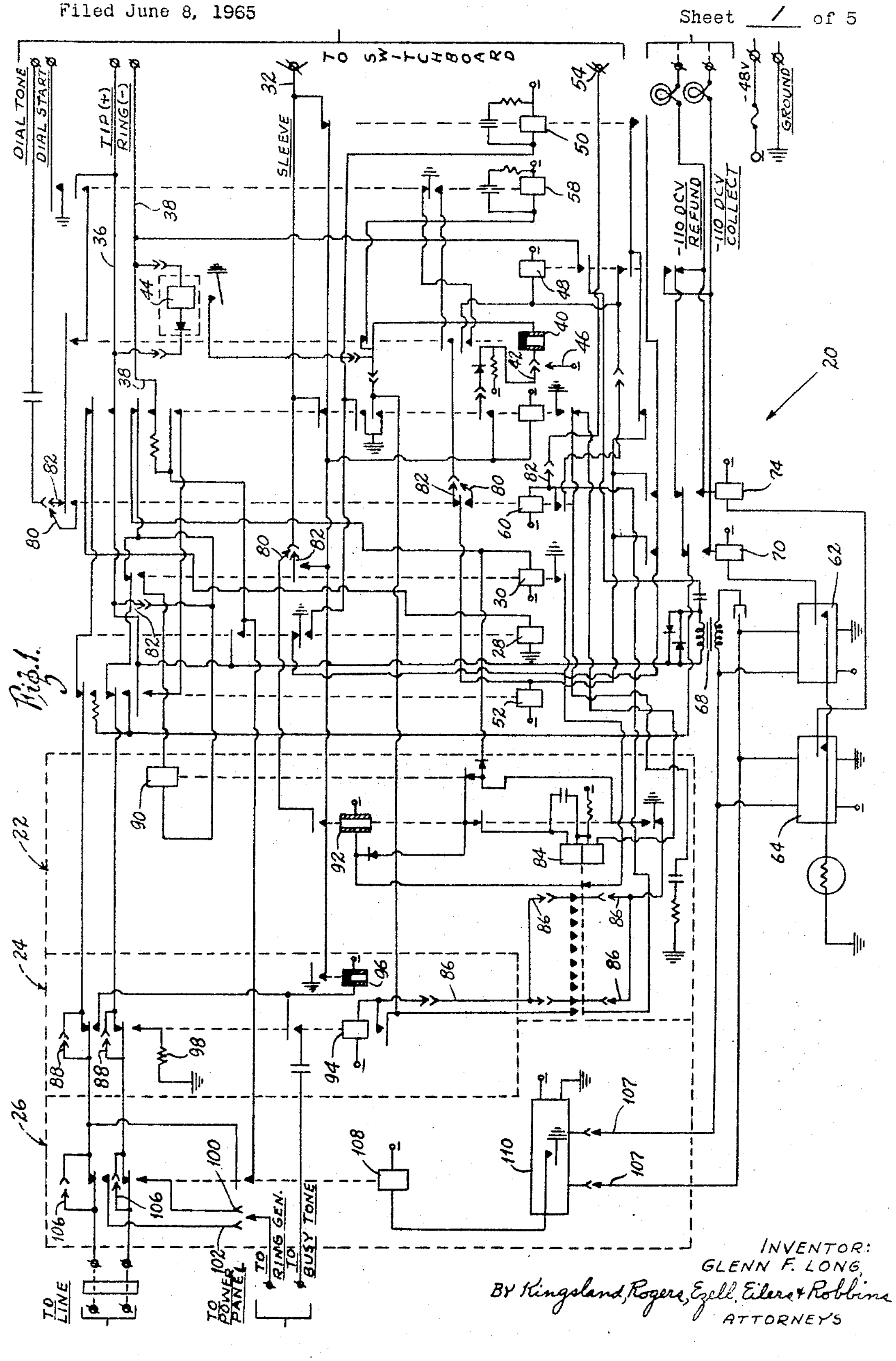
FIGURE 1 is a circuit diagram of the prepay station adapter of this invention.

The prepay pay station adapter is shown in full detail in FIGURE 1, and is generally identified by the reference numeral 20. As shown in FIGURE 1, it includes the optional features of the discrimination circuit 22 for eliminating the extra control lead found in the switchboard, the circuit 24 for blocking of the pay station from further dialing after the first digit, and the circuit 26 for the rering of the pay station. The aforementioned circuits are more fully shown and described in FIGURES 10, 11 and 12, respectively.

Figure 4:
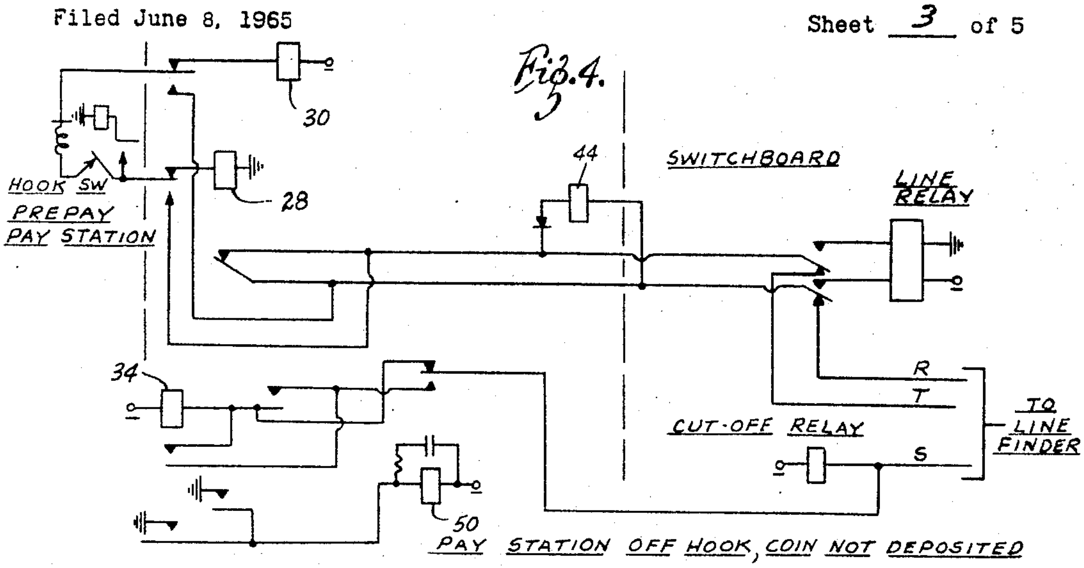
FIGURE 4 is a circuit diagram showing the circuit for the pay station in the off hook condition with the coin not deposited.
Figure 5:
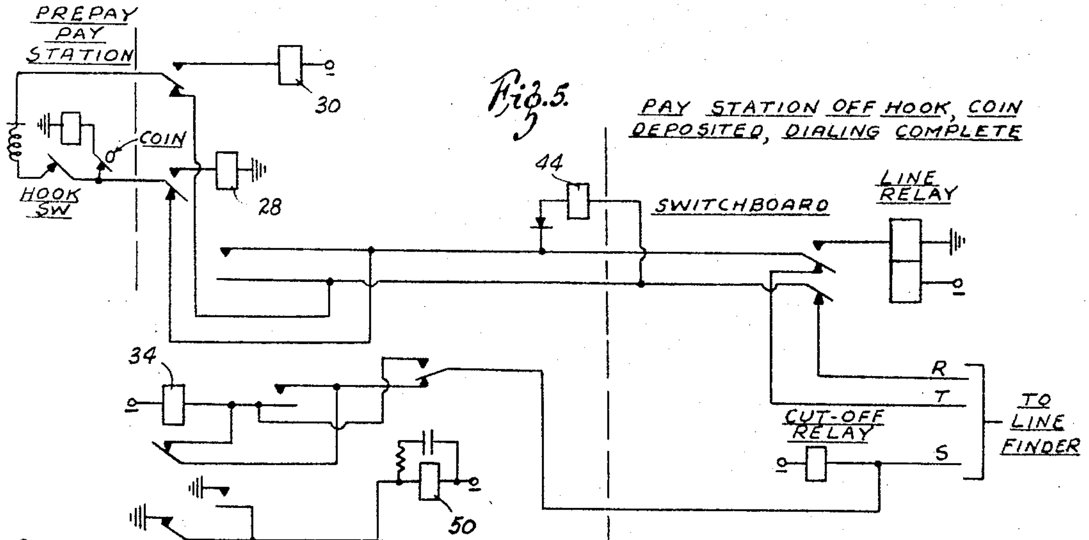
FIGURE 5 is a circuit diagram showing the pay station in the off hook condition with the coin deposited and the dialing complete.

Referring now to FIGURES 1 and 4, when the pay station receiver is lifted, relay 28, a high resistance relay, operates through the line loop in series with relay 30, a low resistance relay. Relay 28 closes the loop to the switchboard, seizing the line equipment and provides control ground for relays 50 and 52 described below. The line equipment returns ground on terminal 32.

Figure 6:
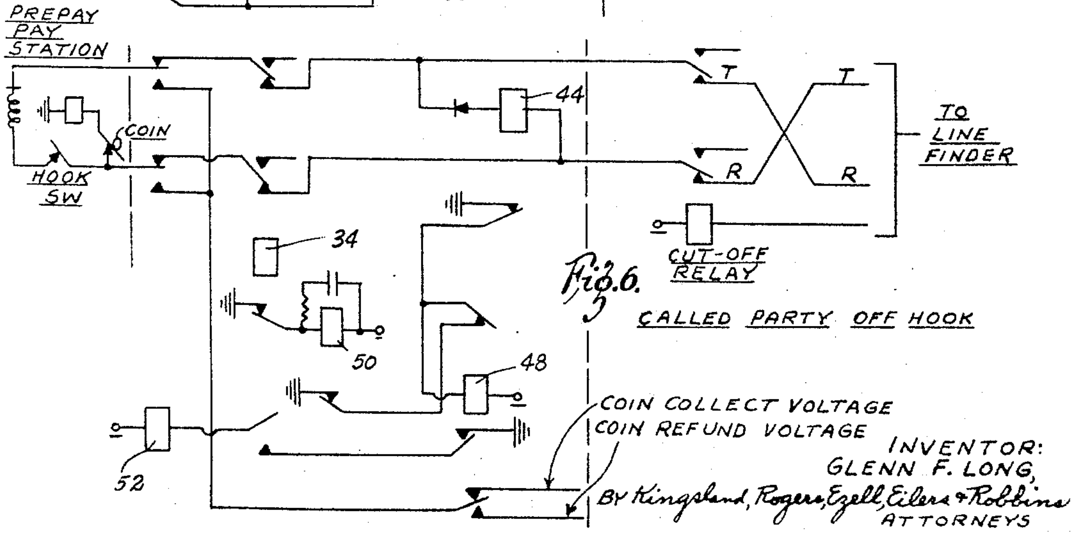
FIGURE 6 is a circuit diagram showing the condition when the called party telephoned is off the hook under reverse battery supervision.
Figure 7:
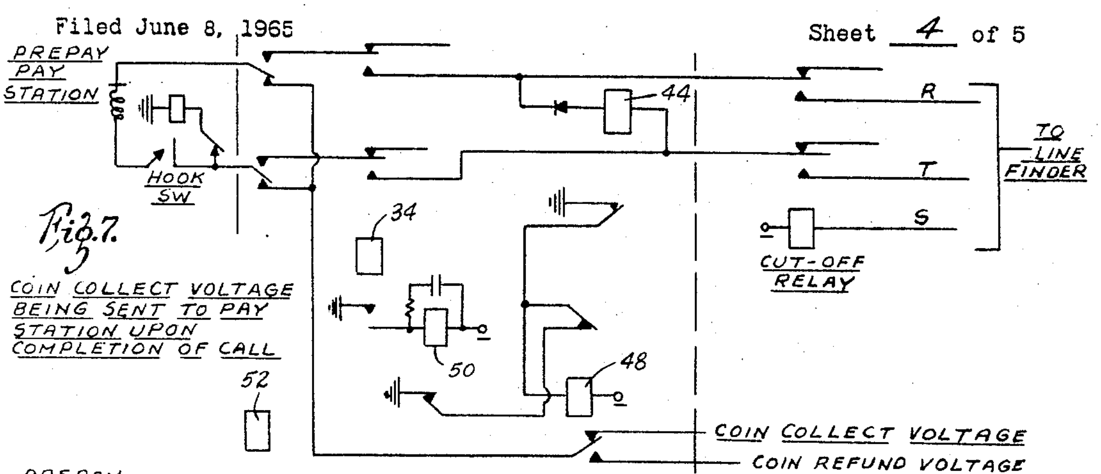
FIGURE 7 is a circuit diagram showing the condition when coin collect voltage is sent to the pay station upon the completion of the call.
Figure 8:
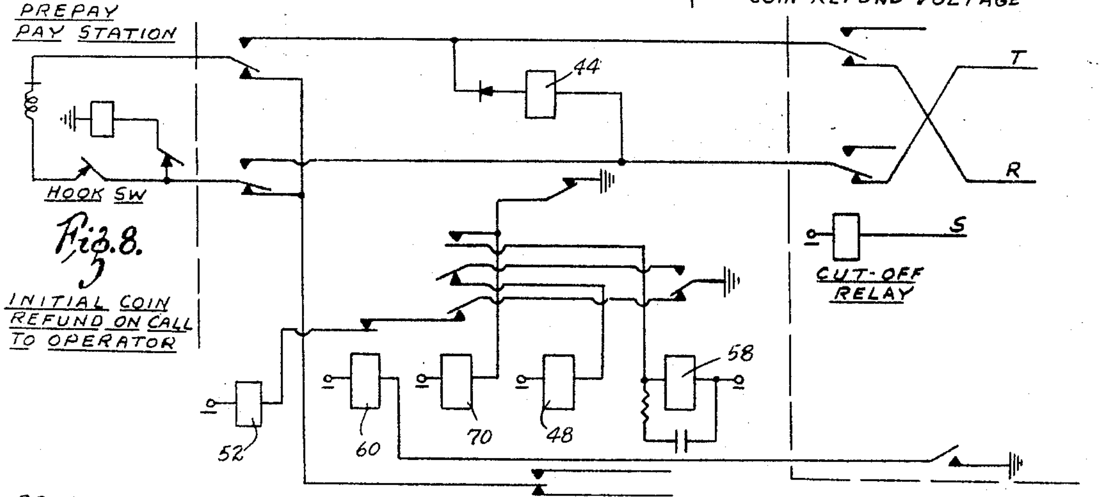
FIGURE 8 is a circuit diagram showing the initial coin refund on call to the operator effected upon the answer by the operator.
Figure 9:
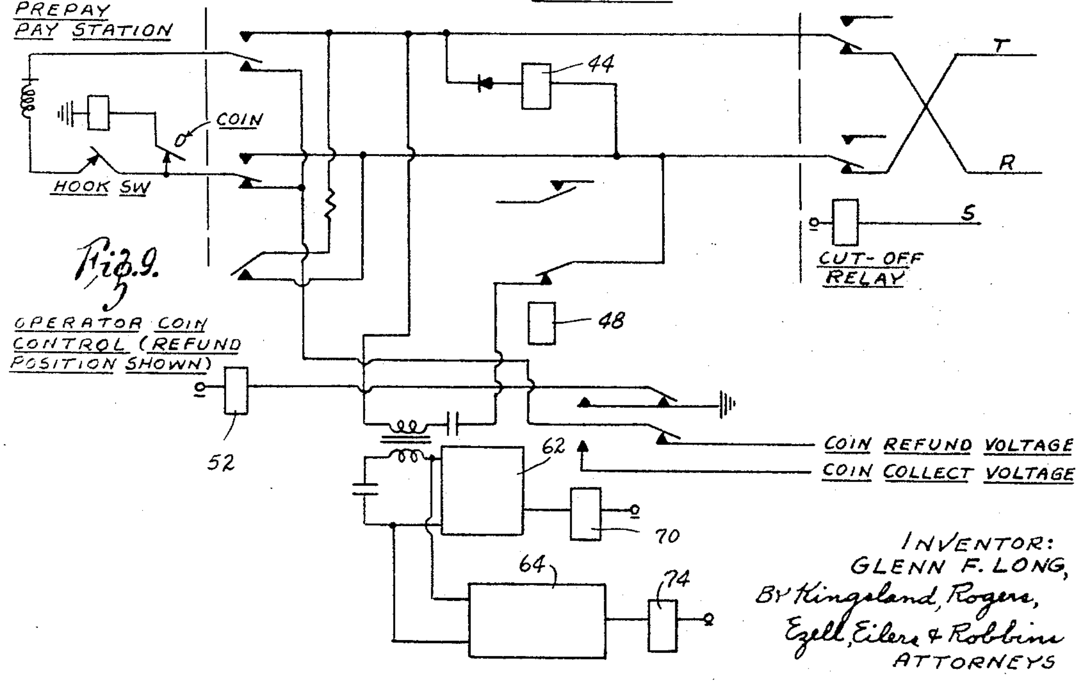
FIGURE 9 is a circuit diagram showing the operator coin control with the refund position shown.

When the calling party deposits the coin, relay 30 operates, and extends the terminal 32 ground to relay 34. Relay 30 provides an operational path from relay 34 from the control terminal 32. Relay 34 operates and transfers the pay station line from the relays 28 and 30 to the switchboard tip and ring leads. This relay operates from terminal 32 and transfers the pay station line to the switchboard line. It extends ground for supervision relays and opens a control path for relay 52. The pay phone now is connected directly to the normal line circuit. The desired number is dialed from the pay station and upon answer, supervision relay 40 operates. This provides control of relay 50 on calls to the operator, and also provides operation path for relay 52 to be described. This is by 150 ohm ground when lead supervision shown by the reference numeral 42 is used, with the reference numeral 42 wiring in the adapter, or from operation of reverse battery relay 44 and wiring shown by the reference numeral 46 when reverse battery supervision is used. The reverse battery supervision is more fully shown in FIGURE 6. Operation of relay 40 indicates answer condition and operates relay 48, which locks to holding ground provided by condenser-controlled slow release relay 50. Relay 48 indiactes answer supervision which exceeds one second in length has been received, and completes the tone circuit to transformer 68 to be described, and also transfers high voltage from refund to collect potential. Relay 50 provides control ground for relays 48 and 52 during coin collect and refund period, and provides operation path for relay 34 on incoming calls to the adapter. When the call is complete, the switchboard releases the adapter by removing ground from terminal 32, and if reverse battery supervision is used, by reversing the tip and ring so that relay 44 will release. Relay 34 and relay 40 release, and relay 50 starts a one second timing period. During this interval of time, collect battery is sent via the operated relay 48 and the operated relay 52 on both sides of the line to the pay phone. Relay 52 extends high voltage for collect or refund purposes to the pay station line. In addition, this relay provides a holding circuit across the switchboard line. The coin in the trap is disposed into the collect bin. At the end of the relay 50 timing period relays 48 and 50 release, completing the circuit release.

Discrimination between an operator call or a local call is performed over terminal 54. Ground appears in this lead when the call is to or from a local number, and ground is absent on terminal 54 when the call is to or from an operator. The circuit performs as described above, and upon answer by the operator, either reverse battery supervision, through wiring 46, or lead supervision through reference numeral 42, operates the relay 40. However, relay 58, a condenser controlled slow release relay operates upon operation of relay 34, and extends ground by operated relay 40 and released relay 60 to operate the relay 52. Relay 58 provides dial tone start signal, and also during its timing period extends dial tone to the tip on the line on calls to operator. In addition, it extends operating ground for the high voltage relay for coin returned on initial answer by the operator. Relay 60 provides discrimination between local calls and calls to or from the operator. On calls to operator, relay 60 does not operate, and provides a path for the dial tone to be returned to the tip of the switchboard for pay station identification. The tone is on the line for approximately one second.

On local calls, relay 60 operates and prevents dial tone from being returned to the switchboard, also opens a control lead of relay 52. Relay 52 extends coin refund high voltage to both sides of the pay station line during the one second timing interval of relay 58. Upon release of relay 58, relay 48 operates and locks to holding ground via operated relay 50.

During the time interval the high voltage was on the line, the coin in the trap was returned to the calling subscriber. With relay 48 operated, an answer condition exists in the pay station adapter, and upon release of the adapter, collect battery will be sent to the pay station, as outlined above.

The coin control by the operator is effected in the following manner. On calls between the pay station adapter and a toll operator, the toll operator may collect or refund coins by use of two tones. For collect purposes a 700 cycle tone source 62 is employed. For refund purposes the operator may employ and send an 1100 cycle tone from source 64 into the adapter.

The operator collection is performed in the folowing manner. The operator depresses a key at the toll position sending out 700 cycles. The tone passes to the primary winding of transformer 68 and is induced into the secondary winding of the transformer to the tone receivers. The 700 cycle receiver responds and operates relay 70. Relay 70 operates and when operated operates relay 52, which extends coin collect high votage to the pay station line and trips the coin trap to the collect bin. High voltage is impressed across both the tip and ring as long as the operator depresses the 700 cycle tone key.

The operator refund is accomplished in the following manner. When the operator wishes to refund coins she presses the 1100 cycle key and this frequency is applied to the transformer 68 and the 1100 cycle receiver responds to operate relay 74. Relay 74 operates relay 52, and extends the refund high voltage to the line. Diodes across the primary of transformer 68 serve as a shunt for dial pulses or ringing current, to prevent voltage from being induced into the secondary of the transformer.

Calls into the adapter are accomplished in the following manner. When the pay station number is dialed, the adapted is seized with ground on terminal 32, operating relay 34, which transfers the tip and ring direct to the pay station line. Relay 40 is operated from either the terminal 32 resistance ground or operation of relay 44. Relay 40, which is a slow release relay, holds during ringing, as relay 44 flutters. Upon completion of the call, collect high voltage is sent to pay station line before release of adapter. Collect and refund high voltage is sent to pay station line by operator as described above by sending 700 cycles or 1100 cycles.

Figure 10:
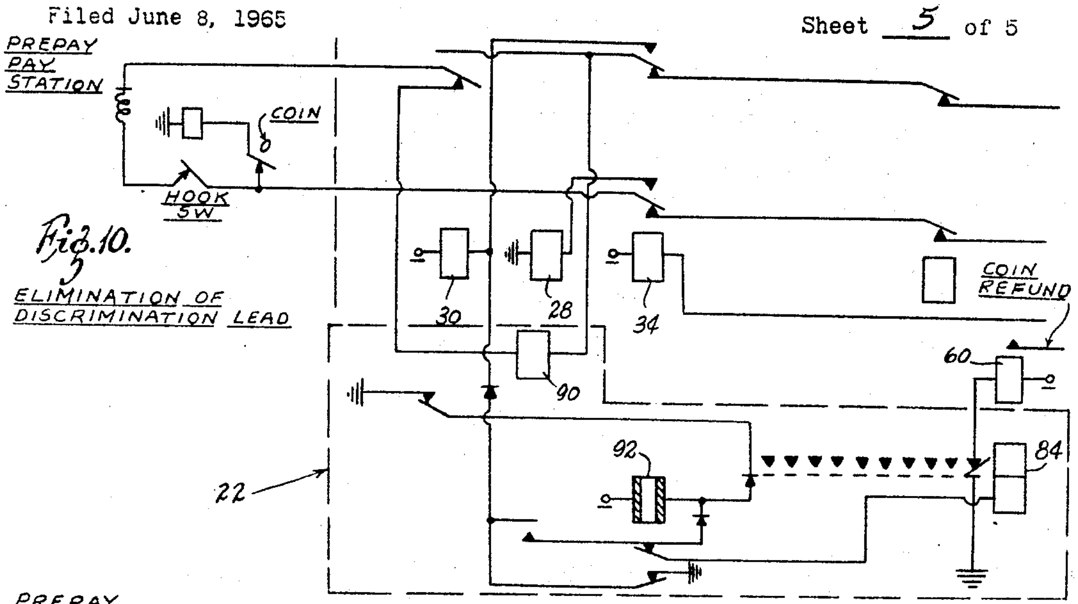
FIGURE 10 is a circuit diagram showing the elimination of the discrimination lead.

The circuit providing built in discrimination, that is circuit 22, is shown in FIGURE 10. When this circuit is employed the need to use the discrimination lead 54 is eliminated. When the party using the pay phone dials the digit assigned for the toll operator, the initial coin to effect such call must be refunded upon answer by the operator. In certain switchboards the discrimination lead 54 is readily available and circuit 22 is not needed. Other switchboards would require a modification to provide the necessary discrimination lead. The option provided by circuit 22 eliminates the need for switchboard modification and furnishes the necessary built-in discrimination circuit. The operation of circuit 22 is as follows. In this circuit the wiring 80 is connected and the wiring 82, otherwise used with the discrimination lead 54, is disconnected. With this change in wiring when the digit "0" is dialed from the pay phone as the first digit the impulse counter 84 records the digit "0" and with the wiring 80 connected the relay 60 is operated, allowing refund of the initial coin upon answer by the operator. This circuit 22 is also used with the circuit 24 for the blocking of the pay station from further dialing after dialing the first digit in connection with FIGURE 11 as will be described beow.

Figure 11:
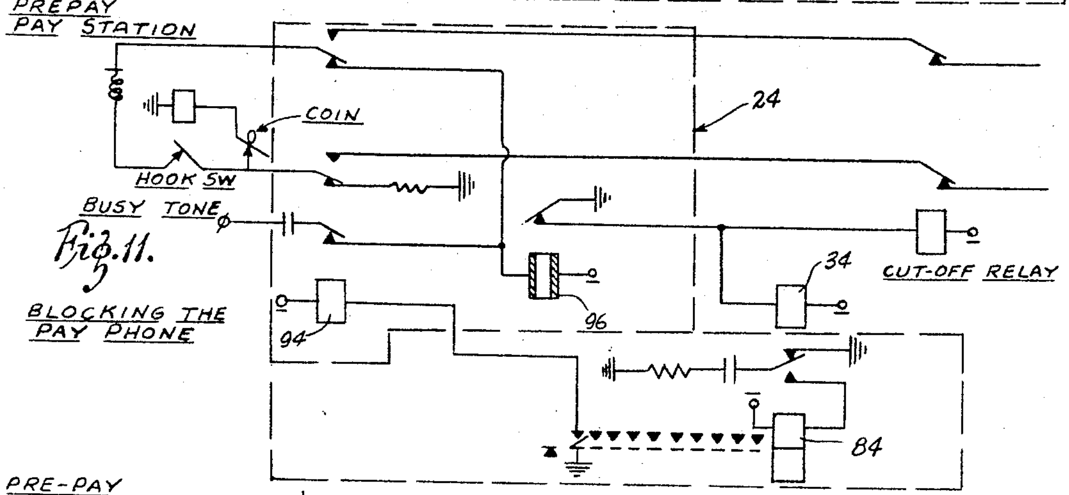
FIGURE 11 is a circuit diagram showing the blocking of the pay phone when an assigned digit is dialed, in this case digit 1.

Circuit 24, shown in FIGURE 11, provides for blocking of the pay station from further dialing when an assigned digit has been dialed. This feature is necessary when the pay station is to be restricted from dialing into certain groups, such as direct distance dialing trunks. When this circuit is employed the wiring changes made in connection with circuit 22 are accomplished, and, in addition, wiring 86 is connected, and wiring 88 is disconnected. As soon as the digit "1" is dialed the pay phone is to be restricted from further dialing. The pay phone hook switch is closed seizing the prepay station adapter. When the coin is deposited, the relay 30 operates inserting relay 90 in series with the line. Relay 90 is inserted in series with the line to register the dial pulses, in turn pulsing the impulse counter. In addition, relay 30 operates relay 92 of FIGURE 10, which completes the path for the impulse counter 84 to receive the dialed pulses from relay 90. Relay 92 is a series relay which holds during dial pulses and releases after first series of pulses, thereby preventing any further pulses from reaching the impulse counter. When the pay station customer dials the digit "1," relay 90 releases one time, sending this impulse to the impulse counter, which advances to lever make 1. Relay 92, a slow release relay, falls upon reoperation of relay 90, and extends ground by operated number one lever make from the impulse counter 84 to relay 94. Relay 94 operates upon receipt of ground from the impulse counter and transfers the pay station from the switchboard to relay 96. It also returns busy tone to the pay station when the blocking digit is dialed. Relay 94 operates and transfers the line from the switchboard to relay 96 and resistor 98. Relay 96 operates in series with the pay phone via the line to resistor 98. Relay 94, when operated, applies a busy signal to the line, and the busy signal is heard in the pay phone. In addition, relay 96 furnishes ground for holding relay 34 of the adapter. When the pay phone hand set is replaced, the hook switch opens, which causes relay 96 to release, in turn releasing relay 34, which extends ground for operation of relay 52. Relay 52 extends the coin refund voltage to the pay phone line.

Figure 12:
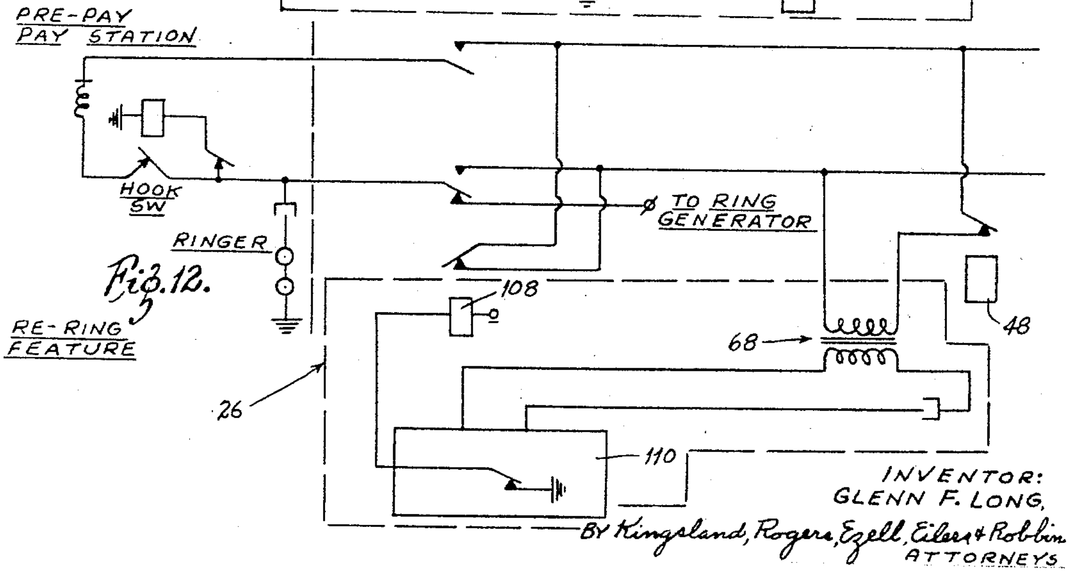
FIGURE 12 is a circuit diagram showing the rering feature.

The optional rering circuit 26 is best shown in FIGURES 1 and 12. For the circuit, wiring 100 is connected to the tip and wiring 102 is connected to the ring. Wiring

106, which is connected when the optional circuit 26 for reringing is not used, is disconnected. Wiring 106 is disconnected and wiring 107 is connected to provide a circuit for the third frequency source as desired. When the operator wishes to rering the pay station after the initial call to the pay station has been established, and without the necessity of releasing connection and reestablishing the call, a third frequency is required at the toll center. To ring the pay phone, the operator depresses a key sending this frequency to the pay station adapter. The rering receiver responds operating relay 108. Relay 108, when operated, connects the ringing generator directly to the pay station line ringing the pay station bells. In addition, relay 108 provides a resistance short to hold the off hook supervision condition to the switchboard during the ringing interval.

The rering receiver 110 responds to an assigned frequency and operates relay 108.

Various changes and modifications may be made within this invention as will be readily apparent to those skilled in the art. Such changes and modifications are within the scope and teaching of this invention as defined by the claims appended hereto.

I claim:

1. A prepay telephone pay station adapter comprising means for connecting the adapter in a line between the pay station and a line equipment at the local switchboard, said adapter comprising means for providing dial tone when an initial coin is deposited at the pay station, means to refund the coin on unanswered calls, means for answer supervision, and means for collecting or refunding additional coins including operator controlled separate tone signals adapted to energize a tuned receiver for operating means in the pay station for collecting or refunding said additional coins, said means for collecting or refunding additional coins including a first tuned frequency receiver responsive to a first operator controlled tone signal adapted to close a direct current circuit to the pay station for collecting said additional coins, and a second tuned frequency receiver responsive to a second operator controlled tone signal adapted to close a direct current circuit to the pay station for refunding said additional coins.

2. A prepay telephone pay station adapter comprising means for connecting the adapter in a line between the pay station and the line equipment at the local switchboard, said adapter comprising means for providing dial tone when an initial coin is deposited at the pay station, means to refund the coin on unanswered calls, means for answer supervision including a relay operable to close a circuit to reverse battery means adapted to energize coin collect mechanism at the pay station, and means for collecting or refunding additional coins including operator controlled separate tone signals adapted to energize a tuned receiver for operating means in the pay station for collecting or refunding said additional coins.

3. A prepay telephone pay station adapter comprising means for connecting the adapter in a line between the pay station and the line equipment at the local switchboard, said adapter comprising means for providing dial tone when an initial coin is deposited at the pay station, means to refund the coin on unanswered calls, means for answer supervision, and means for discrimination between an operator call and a local call upon the dialing of an "operator" digit at the pay station, said means comprising an impulse counter responsive to the dialing of said digit to complete a cricuit to refund the initial coin deposit upon answer by the operator.

4. A prepay telephone pay station adapter comprising means for connecting the adapter in a line between the pay station and the line equipment at the local switchboard, said adapter comprising means for providing dial tone when an initial coin is deposited at the pay station, means to refund the coin on unanswered calls, means for answer supervision, and means for discrimination between an operator call and a local call upon the dialing of an "operator" digit at the pay station, said means comprising an impulse counter responsive to the dialing of said digit to complete a circuit to refund the initial coin deposit upon answer by the operator, and means for collecting or refunding additional coins including operator controlled separate tone signals adapted to energize a tuned receiver for operating means in the pay station for collecting or refunding said additional coins.

5. A prepay telephone pay station adapter comprising means for connecting the adapter in a line between the pay station and the line equipment at the local switchboard, said adapter comprising means for providing dial tone when an initial coin is deposited at the pay station, means to refund the coin on unanswered calls, means for answer supervision, and means for discrimination between an operator call and a local call upon the dialing of an "operator" digit at the pay station, said means comprising an impulse counter responsive to the dialing of said digit to complete a circuit to refund the initial coin deposit upon answer by the operator, and means for collecting or refunding additional coins including operator controlled separate tone signals, said means for collecting or refunding additional coins including a first tuned frequency receiver responsive to a first operator controlled tone signal adapted to close a direct current circuit to the pay station for collecting said additional coins, and a second tuned frequency receiver responsive to a second operator controlled tone signal adapted to close a direct current circuit to the pay station for refunding said additional coins.

6. A prepay telephone pay station adapter comprising means for connecting the adapter in a line between the pay station and the line equipment at the local switchboard, said adapter comprising means for providing dial tone when an initial coin is deposited at the pay station, means to refund the coin on unanswered calls, means for answer supervision, and means for blocking the pay station from further dialing upon the dialing of a selected blocking digit, said means comprising an impulse counter responsive to the dialing of said blocking digit to complete a busy signal circuit to the pay station.

7. A prepay telephone pay station adapter comprising means for connecting the adapter in a line between the pay station and the line equipment at the local switchboard, said adapter comprising means for providing dial tone when an initial coin is deposited at the pay station, means to refund the coin on unanswered calls, means for answer supervision, and means for blocking the pay station from further dialing upon the dialing of a selected blocking digit, said means comprising an impulse counter responsive to the dialing of said blocking digit to complete a busy signal circuit to the pay station, and complete the coin refund circuit upon hang up of the pay station telephone.

8. A prepay telephone pay station adapter comprising means for connecting the adapter in a line between the pay station and the line equipment at the local switchboard, said adapter comprising means for providing dial tone when an initial coin is deposited at the pay station, means to refund the coin on unanswered calls, means for answer supervision, and means for blocking the pay station from further dialing upon the dialing of a selected blocking digit, said means comprising an impulse counter responsive to the dialing of said blocking digit to complete a busy signal circuit to the pay station, and complete the coin refund circuit upon hang up of the pay station telephone, and means operative when said selected blocking digit is not dialed for collecting or refunding additional coins including operator controlled separate tone signals adapted to energize a tuned receiver for operating means in the pay station for collecting or refunding said additional coins.

9. A prepay telephone pay station adapter comprising means for connecting the adapter in a line between the pay station and the line equipment at the local switchboard, said adapter comprising means for providing dial tone when an initial coin is deposited at the pay station, means to refund the coin on unanswered calls, means for answer supervision, and means for blocking the pay station from further dialing upon the dialing of a selected blocking digit, said means comprising an impulse counter responsive to the dialing of said blocking digit to complete a busy signal circuit to the pay station, and complete the coin refund circuit upon hang up of the pay station telephone, and means operative when said selected blocking digit is not dialed for collecting or refunding additional coins including operator controlled separate tone signals adapted to energize a tuned receiver for operating means in the pay station for collecting or refunding said additional coins, said means for collecting or refunding additional coins including a first tuned frequency receiver responsive to a first operator controlled tone signal adapted to close a direct current circuit to the pay station for collecting said additional coins, and a second tuned frequency receiver responsive to a second operator controlled tone signal adapted to close a direct current circuit to the pay station for refunding said additional coins.

10. A prepay telephone pay station adapter comprising means for connecting the adapter in a line between the pay station and the line equipment at the local switchboard, said adapter comprising means for providing dial tone when an initial coin is deposited at the pay station, means to refund the coin on unanswered calls, means for answer supervision, and means for ringing the pay station by the operator, said means comprising operator controlled means for sending out a separate tone signal to the adapter and tuned frequency receiving means in said adapter responsive to said frequency to complete a circuit to a ringing generator to ring the pay station bells.

11. A prepay telephone pay station adapter comprising means for connecting the adapter in a line between the pay station and a line equipment at the local switchboard, said adapter comprising means for providing dial tone when an initial coin is deposited at the pay station, means to refund the coin on unanswered calls, means for answer supervision, and means for collecting or refunding additional coins including operator controlled separate tone signals adapted to energize a tuned receiver for operating means in the pay station for collecting or refunding said additional coins, said means for collecting or refunding additional coins including a first tuned frequency receiver responsive to a first operator controlled tone signal adapted to close a direct current circuit to the pay station for collecting said additional coins, and a second tuned frequency receiver responsive to a second operator controlled tone signal adapted to close a direct current circuit to the pay station for refunding said additional coins, and means for ringing the pay station by the operator, said means comprising operator controlled means for sending out a separate tone signal to the adapter and tuned frequency receiving means in said adapter responsive to said frequency to complete a circuit to a ringing generator to ring the pay station bells.

12. A prepay telephone pay station adapter comprising means for connecting the adapter in a line between the pay station and the line equipment at the local switchboard, said adapter comprising means for providing dial tone when an initial coin is deposited at the pay station, means to refund the coin on unanswered calls, means for answer supervision, and means for discrimination between an operator call and a local call upon the dialing of an "operator" digit at the pay station, said means comprising an impulse counter responsive to the dialing of said digit to complete a circuit to refund the initial coin deposit upon answer by the operator, and means for blocking the pay station from further dialing upon the dialing of a selected blocking digit, said means comprising a circuit connected to the impulse counter responsive to the dialing of said blocking digit to complete a busy signal circuit to the pay station, and means for collecting or refunding additional coins including operator controlled separate tone signals adapted to energize a tuned receiver for operating with means in the pay station for collecting or refunding said additional coins.

13. A prepay telephone pay station adapter comprising means for connecting the adapter in a line between the pay station and the line equipment at the local switchboard, said adapter comprising means for providing dial tone when an initial coin is deposited at the pay station, means to refund the coin on unanswered calls, means for answer supervision, and means for discrimination between an operator call and a local call upon the dialing of an "operator" digit at the pay station, said means comprising an impulse counter responsive to the dialing of said digit to complete a circuit to refund the initial coin deposit upon answer by the operator, and means for blocking the pay station from further dialing upon the dialing of a selected blocking digit, said means comprising a circuit connected to the impulse counter responsive to the dialing of said blocking digit to complete a busy signal circuit to the pay station, and means for collecting or refunding additional coins including operator controlled separate tone signals adapted to energize a tuned receiver for operating means in the pay station for collecting or refunding said additional coins, said means for collecting or refunding additional coins including a first tuned frequency receiver responsive to a first operator controlled tone signal adapted to close a direct current circuit to the pay station for collecting said additional coins, and a second tuned frequency receiver responsive to a second operator controlled tone signal adapted to close a direct current circuit to the pay station for refunding said additional coins.

14. A prepay telephone pay station adapter comprising means for connecting the adapter in a line between the pay station and the line equipment at the local switchboard, said adapter comprising means for providing dial tone when an initial coin is deposited at the pay station, means to refund the coin on unanswered calls, means for answer supervision and means for discrimination between an operator call and a local call upon the dialing of an "operator" digit at the pay station, said means comprising an impulse counter responsive to the dialing of said digit to complete a circuit to refund the initial coin deposit upon answer by the operator, and means for collecting or refunding additional coins including operator controlled separate tone signals adapted to energize a tuned receiver for operating means in the pay station for collecting or refunding said additional coins, and means for ringing the pay station by the operator, said means comprising operator controlled means for sending out a separate tone signal to the adapter and tuned frequency receiving means in said adapter responsive to said tone signal to complete a circuit to a ringing generator to ring the pay station bells.

15. A prepay telephone pay station adapter comprising means for connecting the adapter in a line between the pay station and the line equipment at the local switchboard, said adapter comprising means for providing dial tone when an initial coin is deposited at the pay station, means to refund the coin on unanswered calls, means for answer supervision, and means for blocking the pay station from further dialing upon the dialing of a selected blocking digit, said means comprising an impulse counter responsive to the dialing of said blocking digit to complete a busy signal circuit to the pay station, and means operative when said selected blocking digit is not dialed for ringing the pay station by the operator, said means comprising operator controlled means for sending out a separate tone signal to the adapter and tuned frequency receiving means in said adapter responsive to said tone signal to complete a circuit to a ringing generator to ring the pay station bells.

16. A prepay telephone pay station adapter comprising means for connecting the adapter in a line between the pay station and the line equipment at the local switchboard, said adapter comprising means for providing dial tone when an initial coin is deposited at the pay station, means to refund the coin on unanswered calls, means for answer supervision, and means for blocking the pay station from further dialing upon the dialing of a selected blocking digit, said means comprising an impulse counter responsive to the dialing of said blocking digit to complete a busy signal circuit to the pay station, and means operative when said selected blocking digit is not dialed for ringing the pay station by the operator, said means comprising operator controlled means for sending out a separate tone signal to the adapter and tuned frequency receiving means in said adapter responsive to said frequency to complete a circuit to a ringing generator to ring the pay station bells, and means operative when said selected blocking digit is not dialed for collecting or refunding additional coins including operator controlled separate tone signals adapted to energize a tuned receiver for operating means in the pay station for collecting or refunding said additional coins.

17. A prepay telephone pay station adapter comprising means for connecting the adapter in a line between the pay station and the line equipment at the local switchboard, said adapter comprising means for providing dial tone when an initial coin is deposited at the pay station, means to refund the coin on unanswered calls, means for answer supervision, and means for discrimination between an operator call and a local call, said means comprising an impulse counter responsive to the dialing of an operator digit to complete a circuit to refund the initial coin deposit upon answer by the operator, and means for blocking the pay station from further dialing upon the dialing of a selected blocking digit, said means comprising a circuit connected to the impulse counter responsive to the dialing of said blocking digit to complete a busy signal circuit to the pay station, and means for ringing the pay station by the operator, said means comprising operator controlled means for sending out a separate tone signal to the adapter and tuned frequency receiving means in said adapter responsive to said frequency to complete a circuit to a ringing generator to ring the pay station bells.

18. A prepay telephone pay station adapter comprising means for connecting the adapter in a line between the pay station and the line equipment at the local switchboard, said adapter comprising means for providing dial tone when an initial coin is deposited at the pay station, means to refund the coin on unanswered call, means for answer supervision including a relay operable to close a circuit to reverse battery means adapted to energize coin collect mechanism at the pay station, and means for discrimination between an operator call and a local call upon the dialing of an "operator" digit at the pay station, said means comprising an impulse counter responsive to the dialing of said digit to complete a circuit to refund the initial coin deposit upon answer by the operator, and means for blocking the pay station from further dialing upon the dialing of a selected blocking digit, said means comprising a circuit connected to the impulse counter responsive to the dialing of said blocking digit to complete a busy circuit to the pay station, and means for collecting or refunding additional coins including operator controlled separate tone signals adapted to energize a tuned receiver for operating means in the pay station for collecting or refunding said additional coins, said means for collecting or refunding additional coins including a first tuned frequency receiver responsive to a first operator controlled tone signal adapted to close a direct current circuit to the pay station for collecting said additional coins, and a second tuned frequency receiver responsive to a second operator controlled tone signal adapted to close a direct current circuit to the pay station for refunding said additional coins, and means for ringing the pay station by the operator, said means comprising operator controlled means for sending out a separate tone signal to the adapter and tuned frequency receiving means in said adapter responsive to said frequency to complete a circuit to a ringing generator to ring the pay station bells.

References Cited

UNITED STATES PATENTS

| | | | |
|---|---|---|---|
| 1,043,219 | 11/1912 | Forsberg | 194—45 |
| 2,897,272 | 7/1959 | Gatzert et al. | 179—6.3 |
| 3,003,034 | 10/1961 | Faulkner | 179—6.3 |

WILLIAM C. COOPER, *Primary Examiner.*